(12) United States Patent
Nakanishi et al.

(10) Patent No.: US 12,250,181 B2
(45) Date of Patent: Mar. 11, 2025

(54) RESPONSE SYSTEM, RESPONSE METHOD, AND STORAGE MEDIUM

(71) Applicant: TOYOTA JIDOSHA KABUSHIKI KAISHA, Toyota (JP)

(72) Inventors: Ryosuke Nakanishi, Nisshin (JP); Hikaru Sugata, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 166 days.

(21) Appl. No.: 17/748,593

(22) Filed: May 19, 2022

(65) Prior Publication Data
US 2023/0006948 A1   Jan. 5, 2023

(30) Foreign Application Priority Data

Jul. 1, 2021  (JP) .................................. 2021-109960

(51) Int. Cl.
| | |
|---|---|
| *H04L 51/02* | (2022.01) |
| *G06F 16/33* | (2019.01) |
| *G06F 16/332* | (2019.01) |
| *G06F 16/3329* | (2025.01) |
| *G06F 16/334* | (2025.01) |

(52) U.S. Cl.
CPC .......... *H04L 51/02* (2013.01); *G06F 16/3329* (2019.01); *G06F 16/3344* (2019.01)

(58) Field of Classification Search
CPC ... H04L 51/02; G06F 16/3329; G06F 16/3344
See application file for complete search history.

(56) References Cited

U.S. PATENT DOCUMENTS

| | | | |
|---|---|---|---|
| 2020/0287850 A1* | 9/2020 | Ferrari | G06F 16/90332 |
| 2021/0200954 A1* | 7/2021 | Dsouza | G06N 20/00 |
| 2022/0188513 A1 | 6/2022 | Kitamura et al. | |
| 2023/0281392 A1* | 9/2023 | Martinez | G06N 3/0455 |
| | | | 704/9 |

FOREIGN PATENT DOCUMENTS

| | | |
|---|---|---|
| JP | 2003-022264 A | 1/2003 |
| JP | 2003-242086 A | 8/2003 |
| JP | 2010-092257 A | 4/2010 |
| JP | 2019-204415 A | 11/2019 |
| JP | 2020-154668 A | 9/2020 |

* cited by examiner

*Primary Examiner* — Suraj M Joshi
(74) *Attorney, Agent, or Firm* — Oliff PLC

(57) ABSTRACT

A response system includes an acquisition unit configured to acquire the question sentence of a user, a response sentence selection unit configured to select a response sentence, stored in a storage unit in advance, according to the acquired question sentence, a response sentence conversion unit configured to convert the selected response sentence according to the question sentence, and an output unit configured to output the converted response sentence. The response sentence conversion unit is configured to convert a word included in the selected response sentence to a word included in the question sentence based on the degree of similarity between the word included in the response sentence and the word included in the question sentence.

7 Claims, 6 Drawing Sheets

FIG. 3

| WORD IN QUESTION SENTENCE | CONVERSION CANDIDATE | COMBINATION OF COMPARISON BETWEEN DEGREE OF SIMILARITY | WORD IN RESPONSE SENTENCE | CONVERSION CANDIDATE | DEGREE OF SIMILARITY | CONVERSION VALIDITY |
|---|---|---|---|---|---|---|
| SOSA | ○ (NOUN) | | TEJUNSHO | ○ (NOUN) | 0.6 (SOSA – TEJUNSHO) | – |
| | | | | | 0.9 (MANYUARU – TEJUNNSHO) | ○ |
| | | | | | 0.2 (DOKO – TEJUNSHO) | – |
| MANYUARU | ○ (NOUN) | | WA | | | |
| WA | | | KOCHIRA | ○ (NOUN) | 0.2 (SOSA – KOCHIRA) | – |
| | | | | | 0.3 (MANYUARU – KOCHIRA) | – |
| | | | | | 0.6 (DOKO – KOCHIRA) | × |
| DOKO | ○ (NOUN) | | DESU | | | |
| ? | | | | | | |

\* WORD IS CONVERTED WHEN MAXIMUM DEGREE OF SIMILARITY IS EQUAL TO OR GREATER THAN 0.8

RESPONSE SYSTEM, RESPONSE METHOD, AND STORAGE MEDIUM

CROSS-REFERENCE TO RELATED APPLICATION

This application claims priority to Japanese Patent Application No. 2021-109960 filed on Jul. 1, 2021, incorporated herein by reference in its entirety.

BACKGROUND

1. Technical Field

The present disclosure relates to a response system, a response method, and a storage medium.

2. Description of Related Art

A frequently asked question (FAQ) chatbot system has been introduced for streamlining inquiry processing. As a method to improve the response accuracy of the FAQ chatbot system, Japanese Unexamined Patent Application Publication No. 2019-204415 (JP 2019-204415 A) discloses a technique to learn user's expressions in advance for automatically increasing input patterns.

SUMMARY

However, the system according to this technique outputs a predetermined sentence as a response sentence. Therefore, even when the response is correct, this technique has a problem that the user may miss the response due to a difference in the expression.

In view of this problem, it is an object of the present disclosure to provide a response system, a response method, and a storage medium that can reduce a user's oversight.

A first aspect of the embodiment relates to a response system including an acquisition unit, a response sentence selection unit, a response sentence conversion unit, and an output unit. The acquisition unit is configured to acquire the question sentence of a user. The response sentence selection unit is configured to select a response sentence according to the acquired question sentence. The response sentence is stored in a storage unit in advance. The response sentence conversion unit is configured to convert the selected response sentence according to the question sentence. The output unit is configured to output the converted response sentence. The response sentence conversion unit is configured to convert a word included in the selected response sentence to a word included in the question sentence based on the degree of similarity between the word included in the response sentence and the word included in the question sentence.

A second aspect of the embodiment relates to a response method performed by a computer and including a step of acquiring, a step of selecting, a step of converting, and a step of outputting. The step of acquiring acquires the question sentence of a user. The step of selecting selects a response sentence according to the acquired question sentence. The response sentence is stored in a storage unit in advance. The step of converting converts the selected response sentence according to the question sentence. The step of outputting outputs the converted response sentence. The step of converting converts a word included in the selected response sentence to a word included in the question sentence based on the degree of similarity between the word included in the response sentence and the word included in the question sentence.

A third aspect of the embodiment relates to a storage medium that stores a response program causing a computer to execute a response method. The response method includes a step of acquiring, a step of selecting, a step of converting, and a step of outputting. The step of acquiring acquires the question sentence of a user. The step of selecting selects a response sentence according to the acquired question sentence. The response sentence is stored in a storage unit in advance. The step of converting converts the selected response sentence according to the question sentence. The step of outputting outputs the converted response sentence. The step of converting converts a word included in the selected response sentence to a word included in the question sentence based on the degree of similarity between the word included in the response sentence and the word included in the question sentence.

The present disclosure can provide a response system, a response method, and a storage medium that can reduce a user's oversight.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a schematic diagram schematically showing an operation in which the response system according to the first embodiment converts a response sentence;

DETAILED DESCRIPTION OF EMBODIMENTS

First Embodiment

While the present disclosure will be described below by way of an embodiment of the disclosure, it should be noted that the disclosure described in Claims is not limited to the embodiment described below. It should also be noted that not all of the configurations described in the embodiment are indispensable for solving the problem.

A response system according to the embodiment will be described with reference to the drawings. A response system according to a first embodiment is an FAQ chatbot system that outputs a response sentence to a question sentence received from the user. The FAQ chatbot system is a system that searches a database (DB) consisting of pairs of a question sentence and an answer sentence and presents an appropriate response sentence. A response sentence may include only an answer sentence, or may include both a question sentence and an answer sentence. It is assumed that the pairs of a question sentence and an answer sentence have been created in advance by the administrator or the operator.

Figure 1:
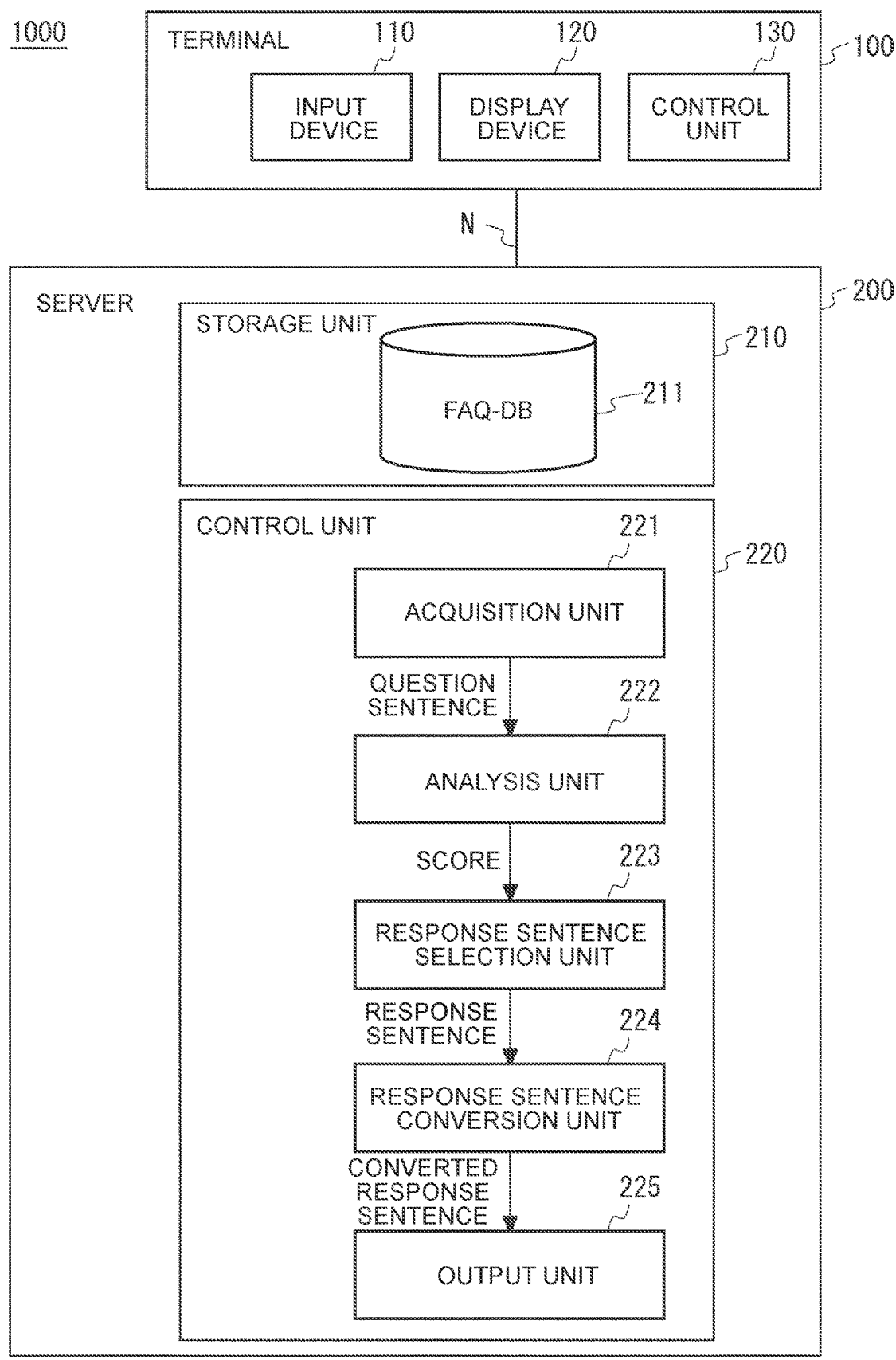
FIG. 1 is a block diagram showing a configuration of a response system according to a first embodiment.

FIG. 1 is a block diagram showing a configuration of a response system 1000 according to the first embodiment. The response system 1000 includes a terminal 100 and a server 200. The terminal 100 and the server 200 are connected to each other via the network N. The network N may be wired or wireless.

The functions of the server 200, which will be described later, may be provided on the terminal 100 side. A system in which the server 200 is not included and the processing is completed in the terminal 100 may also be included in the response system according to the first embodiment.

The terminal 100 is a terminal operated by a user who uses the response system 1000. The terminal 100 may be a personal computer (PC) or a smartphone. The terminal 100 may also be a robot such as a communication robot.

The terminal 100 includes an input device 110 for a user to input a question sentence, a display device 120 such as a display, and a control unit 130. The input device 110 may be a device for inputting text (for example, a mouse, a keyboard, a touch panel) or a device for inputting voice (for example, a microphone). The display device 120 displays a response sentence that is returned in response to a user's question sentence. The terminal 100 may output a response sentence, corresponding to a user's question sentence, by voice. In such a case, the terminal 100 does not have to include the display device 120. The control unit 130 includes the components such as a processor and a memory. The control unit 130 acquires a question sentence entered from the input device 110, sends it to the server 200, and causes the display device 120 to display a response sentence output by the server 200.

The server 200 includes a storage unit 210 and a control unit 220. The storage unit 210 is a storage device such as a hard disk and a flash memory. The storage unit 210 stores a FAQ-DB 211 that stores a plurality of pairs of a question sentence and an answer sentence. The storage unit 210 is also referred to as an agent information storage unit. It is assumed that a question sentence and an answer sentence are each represented by a vector in advance. The FAQ-DB 211 stores, for example, the text of a question sentence, the text of an answer sentence, the word vector of each of the words included in the question sentence, and the word vector of each of the words included in the answer sentence.

The storage unit 210 may further store a word vector dictionary (not shown) used, for example, for analysis of question sentences. The storage unit 210 further stores a response program (not shown) for responding to a question sentence received from the user.

The control unit 220 includes a processor and a memory. The processor executes the response program to cause the control unit 220 to operate as an acquisition unit 221, an analysis unit 222, a response sentence selection unit 223, a response sentence conversion unit 224, and an output unit 225.

The acquisition unit 221 is a module that acquires a user's question sentence entered from the terminal 100. The acquisition unit 221 is also referred to as a speech acquisition unit for acquiring the speech of the user. A user's question sentence is input, for example, via the chat interface. A question sentence may be input by voice or by text. Note that, when inputting a question sentence via the voice interface, it is necessary to recognize the voice and to perform processing to convert the input voice information into text.

The analysis unit 222 is a module that analyzes the acquired question sentence and calculates the score of each of the question sentences stored in the FAQ-DB 211. The calculated score is used when the response sentence selection unit 223, which will be described later, selects a response sentence. The detail of the operation of the analysis unit 222 will be described later.

The response sentence selection unit 223 selects a response sentence, stored in advance in the FAQ-DB 211, according to the acquired question sentence. In other words, the response sentence selection unit 223 is a module that selects a response sentence to be output by each agent according to the score calculated by the analysis unit 222. The response sentence selection unit 223 may select a question sentence having the maximum score and the corresponding answer sentence as the response sentence based on the score calculated by the analysis unit 222. The response sentence selection unit 223 may also select a plurality of response sentences and determine the priority of each of the response sentences.

The response sentence conversion unit 224 is a module that replaces a word, contained in the response sentence selected by the response sentence selection unit 223, with a word contained in the question sentence acquired by the acquisition unit 221. The detail of the operation of the response sentence conversion unit 224 will be described later.

The output unit 225 is a unit that outputs the converted response sentence to the terminal 100. The output unit 225 is also called a screen display unit. In other words, the output unit 225 is a module that displays the response sentence of each agent on the display device 120 of the terminal 100. The output unit 225 may output the user's question sentence along with the response sentence. As described above, the response sentence may include only the answer sentence, or may include both the question sentence and the answer sentence. The output unit 225 may display a plurality of response sentences according to priority. Furthermore, the output unit 225 may cause the speaker (not shown) of the terminal 100 to output the response sentence by voice.

As described above, a part or all of the functions of the control unit 220 may be provided on the terminal 100 side. Furthermore, the storage unit 210 may also be provided on the terminal 100 side. Therefore, the response system 1000 does not have to include the server 200.

Figure 2:
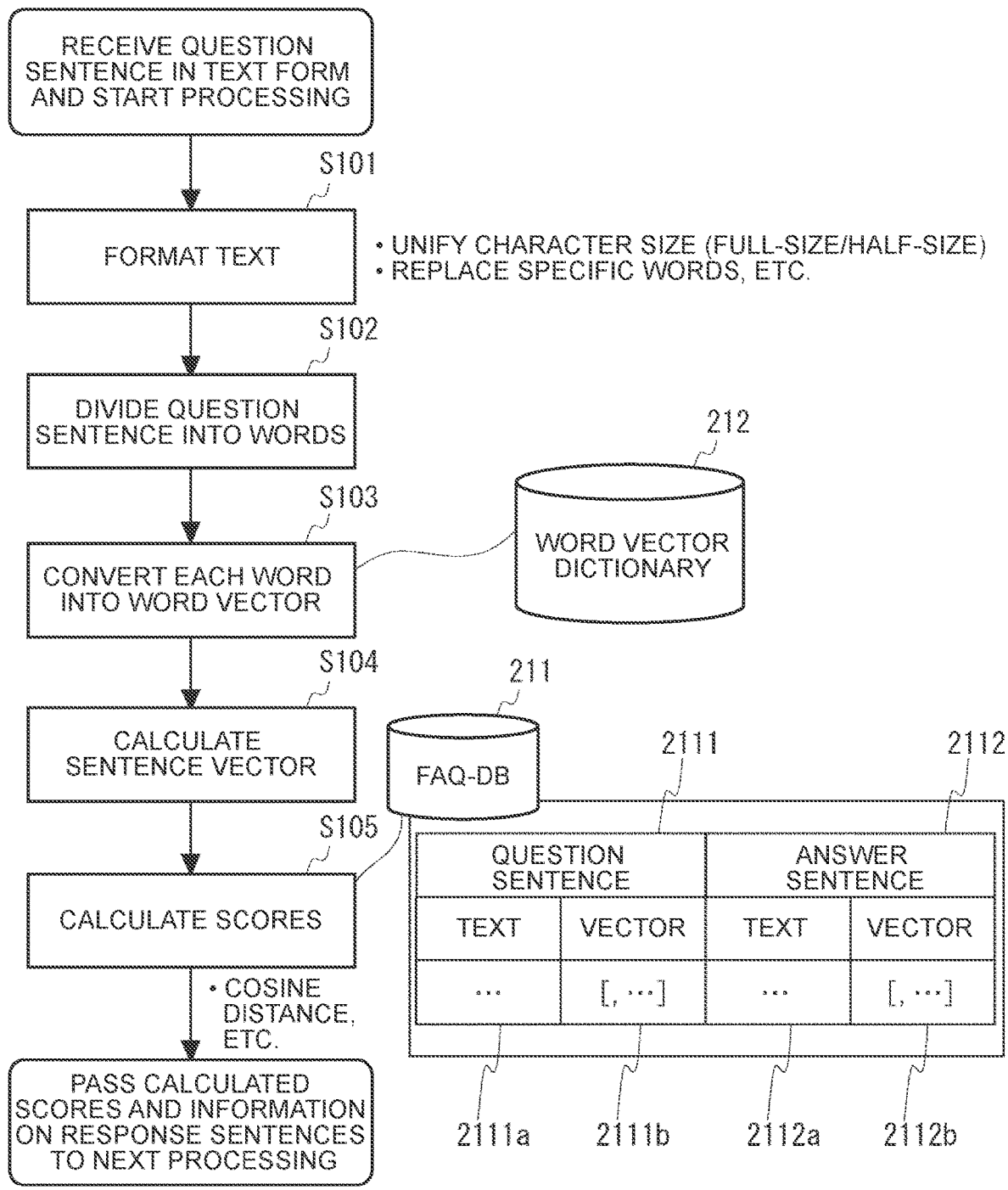
FIG. 2 is a flowchart showing an operation in which the response system according to the first embodiment analyzes a question sentence.

Next, the operation of the analysis unit 222 will be described in detail with reference to FIG. 2. It is assumed that the analysis unit 222 has received a question sentence in text form. First, the analysis unit 222 formats the text of the question sentence (step S101). More specifically, the analysis unit 222 unifies the character size (full-size/half-size) of the characters included in the question sentence and replaces specific words.

Next, the analysis unit 222 divides the formatted question sentence into a plurality of words (step S102). Word division is implemented by a known technique such as the Viterbi algorithm or long short-term memory (LSTM).

Next, the analysis unit 222 converts each word, generated as the result of word division, into a word vector using a word vector dictionary 212 created in advance (step S103). Through this conversion, the analysis unit 222 acquires the word vector of the words included in the question sentence. The word vector dictionary 212 may be implemented by known techniques such as Continuous Bag Of Words (CBOW) and Skip-gram, or by an extended version of them such as Global Vectors (GloVe). Note that the analysis unit 222 does not have to convert all parts of speech into vectors. For example, the analysis unit 222 may convert only nouns and verbs into vectors.

Next, the analysis unit 222 calculates the sentence vector of the question sentence from the list of word vectors (step S104). The sentence vector may be calculated by a method of averaging the word vectors or by a method of using deep neural network (DNN) such as LSTM based on the word vectors.

Next, the analysis unit 222 calculates the scores each representing the degree of similarity between the sentence vector of a question sentence stored in the FAQ-DB 211 and the sentence vector of the user's question sentence (step S105). The FAQ-DB 211 stores the text 2111a of a question sentence 2111 and the word vector 2111b of each of the one or more words included in the question sentence 2111. The FAQ-DB 211 also stores the text 2112a of an answer sentence 2112 and the word vector 2112b of each of the one or more words included in the answer sentence 2112. Therefore, the sentence vector of the stored question sentence 2111 can be calculated based on the word vectors 2111b in the same manner as the sentence vector of the user's question sentence. The calculated sentence vectors may also be stored in the FAQ-DB 211 in advance.

The score is calculated, for example, by calculating the cosine distance between sentence vectors. The score may also be calculated using a classification model of machine learning such as Support Vector Machine (SVM) or Convolutional Neural Network (CNN). The score may also be the classification probability used in a machine learning classification model.

After that, the analysis unit 222 passes the calculated scores and the information on the corresponding response sentences to the next processing. The calculated scores are used by the response sentence selection unit 223 to select a response sentence.

Next, the operation of the response sentence conversion unit 224 in FIG. 1 will be described in detail. The response sentence conversion unit 224 uses the word vector of each word, extracted by the analysis unit 222, to calculate the degree of similarity between a word included in the user's question sentence and a word included in the response sentence selected by the response sentence selection unit 223. More specifically, the response sentence conversion unit 224 calculates the degree of similarity between each word included in the response sentence and each word included in the user's question sentence. The degree of similarity between words may be the cosine distance between the word vectors.

As mentioned above, the response sentence may include both a question sentence and an answer sentence. Therefore, the response sentence conversion unit 224 may calculate the degree of similarity between a word included in the selected answer sentence and a word included in the user's question sentence and, in addition, may calculate the degree of similarity between a word included in the selected question sentence and a word included in the user's question sentence. The response sentence conversion unit 224 does not have to convert all parts of speech, but may convert only the nouns and verbs. A part of speech such as an adjective may also be converted.

Next, the response sentence conversion unit 224 determines a word that is included in the user's question sentence and that has the maximum degree of similarity with a word included in the response sentence. In other words, the response sentence conversion unit 224 extracts a combination of a word included in the response sentence and a word having the maximum degree of similarity with that word. Then, the response sentence conversion unit 224 determines whether the degree of similarity described above is equal to or greater than the threshold value. When the degree of similarity is equal to or greater than threshold value, the response sentence conversion unit 224 converts each of the above words included in the response sentence into the determined word.

Next, the operation of the response sentence conversion unit 224 will be described in detail with reference to FIG. 3. In the example below, the user's question sentence is "Sosa manyuaru wa doko?" It is assumed that the response sentence selection unit 223 has already selected the response sentence "Tejunsho wa kochira desu."

In such a case, the user's question sentence is divided into words "sosa", "manyuaru", "wa", "doko", and "?". When nouns and verbs are conversion candidates, the nouns "sosa", "manyuaru", and "doko" are conversion candidates. The selected response sentence is divided into words "tejunsho", "wa", "kochira)", and "desu." In the response sentence, the nouns "tejunsho" and "kochira" are conversion candidates.

The response sentence conversion unit 224 calculates the degree of similarity between the conversion candidates "tejunsho" and "kochira", included in the response sentence, and the conversion candidates "sosa", "manyuaru", and "doko" included in the user's question sentence. In the example, it is assumed that the degree of similarity between "sosa" and "tejunsho" is 0.6, that the degree of similarity between "manyuaru" and "tejunsho" is 0.9, and that the degree of similarity between "doko" and "tejunsho" is 0.2. It is also assumed that the degree of similarity between "sosa" and "kochira" is 0.2, that the degree of similarity between "manyuaru" and "kochira" is 0.3, and that the degree of similarity between "doko" and "kochira" 0.6.

In such a case, the response sentence conversion unit 224 determines "manyuaru" as the word having the maximum degree of similarity with "tejunsho" in the response sentence. Then, the response sentence conversion unit 224 determines that the degree of similarity between the "tejunsho" and the "manyuaru" is 0.9 and that this degree of similarity is equal to or greater than the threshold value (for example, 0.8). Therefore, the response sentence conversion unit 224 converts (replaces) "tejunsho", included in the response sentence, into "manyuaru" included in the user's question sentence.

In addition, the response sentence conversion unit 224 determines "doko" as the word having the maximum degree of similarity with "kochira" included in the response sentence. Then, the response sentence conversion unit 224 determines that the degree of similarity between "kochira" and "doko" is 0.6 and that this degree of similarity does not exceed the threshold value (for example, 0.8). Therefore, the response sentence conversion unit 224 does not convert (replace) "kochira", included in the response sentence, into "doko" included in the user's question sentence.

In this way, the response sentence conversion unit 224 converts the selected response sentence "Tejunsho wa kochira desu" into "Manyuaru wa kochira desu." Since the response sentence includes "manyuaru" that was entered by the user when asking the question, the user's oversight can be reduced.

The response sentence conversion unit 224 may further convert the response sentence by taking into account the user's past question history. That is, based on the degree of similarity between a word in the selected response sentence and a word extracted from the history of user's past question sentences, the response sentence conversion unit 224 may further convert a word included in the response sentence. Converting a word included in the response sentence into a word that the user normally uses can further reduce a user's oversight.

The response sentence conversion unit 224 creates a list of words included in the history, calculates the degree of similarity between each word included in the list and each word included in the selected response sentence, and converts a word based on the degree of similarity. In this case, when the history of question sentences includes many words, it may be difficult to calculate the degree of similarity. In such a case, the response sentence conversion unit 224 may extract a part of the words included in the list and use the extracted words as the conversion candidates.

Figure 4:
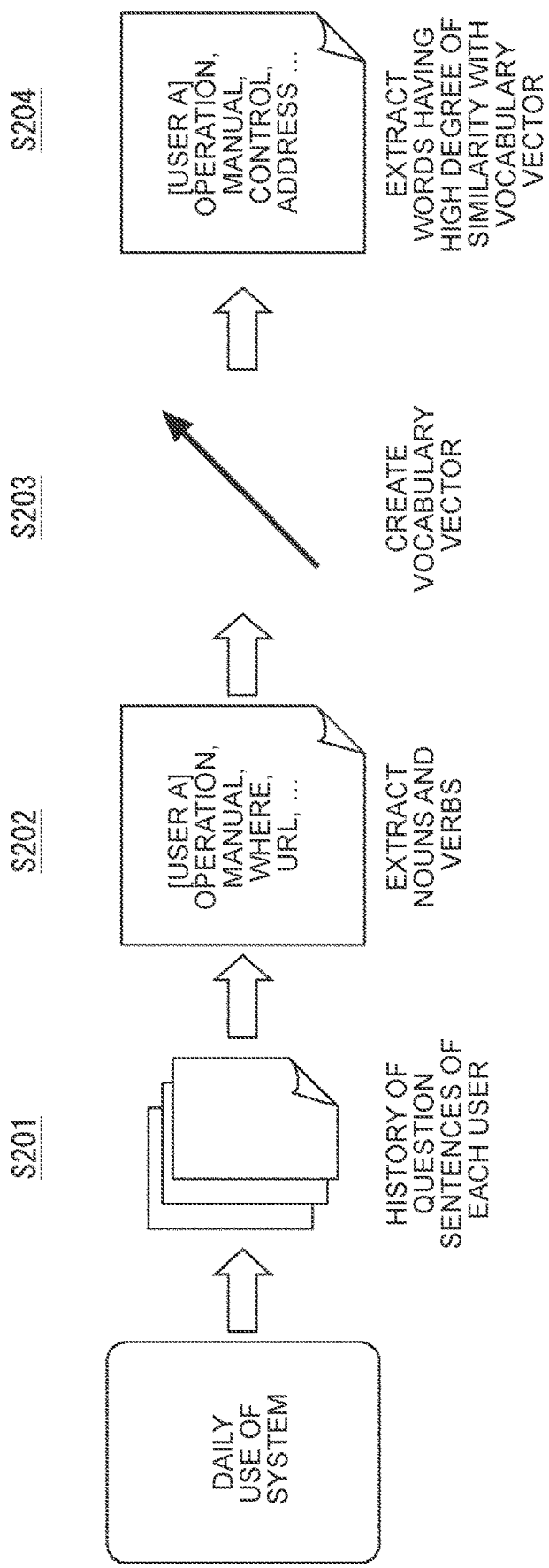
FIG. 4 is a schematic diagram schematically showing an operation in which the response system according to the first embodiment converts a response sentence based on the history of question sentences.

A method of using the user's past question history will be described with reference to FIG. 4. It is assumed that a plurality of users uses the response system 1000 on a daily basis and that the history of question sentences of each user is accumulated (step S201). The response sentence conversion unit 224 creates a list of words (for example, nouns and verbs) extracted from the words included in the history of question sentences (step S202). For example, the list of user A includes many words including "operation", "manual", "where", and "URL."

The response system 1000 can calculate the degree of similarity between each of the words included in the list of user A and each of the words included in the response sentence to be sent to user A and, based on the calculated degree of similarity, convert one or more words included in the response sentence. When there are many words included in the list, the processing may proceed to step S203.

The response sentence conversion unit 224 generates a vocabulary vector based on the list (step S203). The vocabulary vector is calculated by referring to the word vector dictionary and by calculating the average (for example, simple average) of the word vectors of the plurality of words included in the list. After that, from the words included in the list, the response sentence conversion unit 224 extracts N words (N is an integer equal to or larger than one) having a high degree of similarity (for example, cosine distance) with the vocabulary vector (step S204). Note that a word having a high degree of similarity with the vocabulary vector means a word with its word vector having a high degree of similarity with the vocabulary vector. For example, N words including "operation", "manual", "control", and "address" are extracted from the list of user A.

In this way, words around the vocabulary vector are extracted from the list. The vocabulary vector is a vector obtained by taking the average of a plurality of words included in the list. Therefore, the words around the vocabulary vector are considered to be the words that the user usually uses. Words may also be extracted based on the frequency of use of each word. The response system 1000 can convert the response sentence using the extracted N words.

The response system according to the first embodiment converts a word, included in the response sentence, into a word used in the question sentence. By using the word included in the question sentence, the response system according to the first embodiment can reduce a user's oversight caused due to a difference in expression. The response system according to the first embodiment can also reduce the cognitive load of the user.

When checking a response sentence, the question sentence entered by the user remains strongly in the user's memory. This means that converting the response sentence using a word included in the question sentence is considered to advantageously reduce a user's oversight.

The response system according to the first embodiment dynamically generates a response sentence according to the user's expression. Therefore, the response system eliminates the need for preparing, in advance, the templates of answer sentences each with a different expression and the patterns of question sentences. In addition, the response system according to the first embodiment, which changes the response contents according to the user's question, makes it possible to soften the mechanical impression for realizing a natural dialogue interaction.

In addition, the response system according to the first embodiment can use the history of user's question sentences to further convert a word included in a response sentence. Since a word included in the response sentence can be converted according to the characteristics of the user, the response system according to the first embodiment can further reduce a user's oversight.

First Modification

The response system according to the first embodiment may output a sentence that does not hold grammatically. In the case of the example shown in FIG. 3, when "kochira" is replaced with "doko", the response sentence "manyuaru wa doko desu" is output. To prevent this, it is necessary, after replacing the words, to evaluate the validity, that is, the grammatical correctness, of a sentence.

Figure 5:
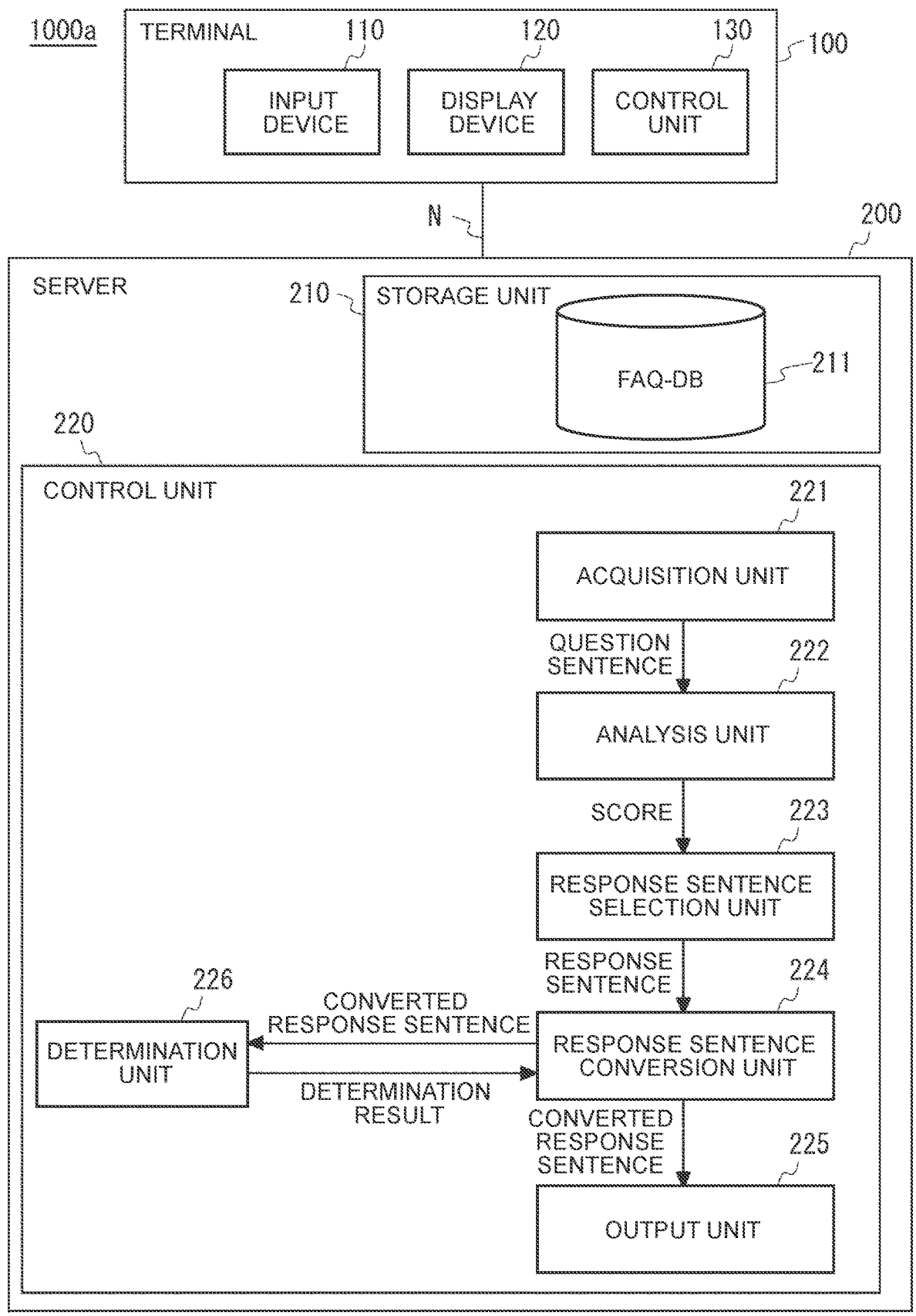
FIG. 5 is a block diagram showing a configuration of a response system according to a modification of the first embodiment.

FIG. 5 is a block diagram showing the configuration of a response system 1000a according to a modification. Comparison between the configuration in FIG. 1 and the configuration in FIG. 5 indicates that a determination unit 226 is added to the control unit 220 of the server 200 in FIG. 5. The determination unit 226 determines whether a response sentence, converted by the response sentence conversion unit 224, has an error.

The response sentence conversion unit 224 outputs the converted response sentence to the determination unit 226 and receives the determination result. When an error is detected, the response sentence conversion unit 224 cancels at least a part of word conversion in the response sentence. For example, the response sentence conversion unit 224 may cancel the conversion of N words (N is an integer equal to or larger than one) that are included in the plurality of converted words but have a low degree of similarity. When an error is not detected, the response sentence conversion unit 224 does not cancel the word conversion in the response sentence and outputs the response sentence without change.

The determination unit 226 may detect an error in the response sentence using a deep learning model such as CNN or RNN. The determination unit 226 may also detect an error using an n-gram that expresses the probability of appearance of adjacent words.

Figure 6:
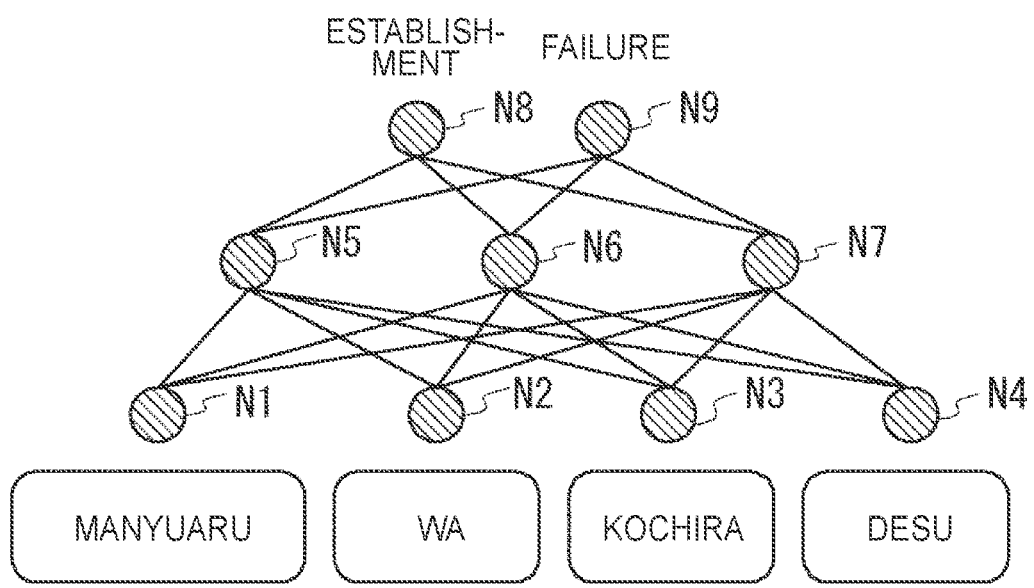
FIG. 6 is a schematic diagram schematically showing an operation in which the response system according to the modification of the first embodiment determines an error in a sentence.

FIG. 6 is a schematic diagram schematically showing a method of detecting an error in a response sentence using a deep learning model. N1 to N9 represent the nodes of the neural network. N1 to N4 represent the nodes of the input layer, N5 to N7 represent the nodes of the intermediate layer, and N8 to N9 represent the nodes of the output layer. N1 to N4 receive "manyuaru", "wa", "kochira", and "desu" that constitute the response sentence. N8 to N9 correspond to the establishment of the response sentence and the failure of the response sentence, respectively. The neural network, consisting of N1 to N9, can output the probability that the converted response sentence is established (hereinafter, also referred to as the probability of establishment) and the probability that the converted response sentence is not established (hereinafter, also referred to as the probability of failure).

When the probability of establishment exceeds the probability of failure, the response sentence conversion unit 224 does not cancel the conversion of the words in the response sentence and outputs the response sentence without change. On the other hand, when the probability of establishment is equal to or less than the probability of failure, the response sentence conversion unit 224 cancels at least a part of word conversion.

Next, the effect achieved by the response system according to the modification of the first embodiment will be described. A response sentence, when converted, may not be established as a sentence in some cases. The response system according to the modification of the first embodiment can determine an error in a response sentence before outputting the response sentence and output an appropriate response sentence.

Though the hardware configuration of the response system is described in the embodiment described above, the configuration is not limited thereto. The present disclosure may be implemented by causing the CPU to execute a computer program for performing any processing.

In the above example, the program, when read into the computer, includes instructions (or software code) for causing the computer to perform one or more functions described in the embodiment. The program may be stored on a non-transitory computer-readable medium or on a tangible storage medium. Examples of computer-readable media or tangible storage media include, but not limited to, a random-access memory (RAM), a read-only memory (ROM), a flash memory, a solid-state drive (SSD), or other memory techniques, a CD-ROM, a digital versatile disc (DVD), a Blu-ray (registered trademark) disc, or other optical disc storage, a magnetic cassette, a magnetic tape, a magnetic disk storage, or other magnetic storage devices. The program may be sent via a transitory computer-readable medium or a communication medium. Examples of transitory computer-readable media or communication media include, but not limited to, electrical, optical, acoustic, or other forms of propagating signals.

The present disclosure is not limited to the above embodiment, and can be appropriately changed without departing from the spirit.

What is claimed is:

1. A response system comprising
a memory, and
a processor configured to:
acquire a question sentence of a user;
select a response sentence according to the acquired question sentence, the response sentence being stored in a storage device in advance;
convert the selected response sentence according to the question sentence;
output the converted response sentence;
convert a first word included in the selected response sentence to a second word included in the question sentence when a degree of similarity between the first and the second word is equal to or greater than a threshold value; and
cancel converting of the first word to the second word by using nodes in a neural network when a failure probability exceeds an establishment probability, wherein
the failure probability is a probability that the converted response sentence is not established, and
the establishment probability is a probability that the converted response sentence is established.

2. The response system according to claim 1, wherein the processor is configured to determine whether an error in the converted response sentence is present.

3. The response system according to claim 1, wherein the processor is further configured to convert the first word when a degree of similarity between the first word and a third word extracted from a history of past question sentences of the user is equal to or greater than the threshold value.

4. The response system according to claim 3, wherein the processor is configured to generate a vocabulary vector and to extract a fourth word having a high degree of similarity with the vocabulary vector from the history, the vocabulary vector being generated by averaging word vectors of a plurality of words included in the history.

5. The response system according to claim 1, wherein the processor is configured to determine a fifth word that is included in the question sentence of the user and has a maximum degree of similarity with the first word and to convert the first word into the fifth word when the maximum degree of the similarity is equal to or greater than the threshold value.

6. A response method performed by a computer and comprising:
acquiring a question sentence of a user;
selecting a response sentence according to the acquired question sentence, the response sentence being stored in a storage device in advance;
converting the selected response sentence according to the question sentence; and
outputting the converted response sentence; and
canceling converting of a first word to a second word by using nodes in a neural network when a failure probability exceeds an establishment probability, wherein
in the converting of the selected response sentence, the first word included in the selected response sentence is converted to the second word included in the question sentence when a degree of similarity between the first and the second word is equal to or greater than a threshold value,
the failure probability is a probability that the converted response sentence is not established, and
the establishment probability is a probability that the converted response sentence is established.

7. A non-transitory storage medium that stores a response program causing a computer to execute a response method comprising:
acquiring a question sentence of a user;
selecting a response sentence according to the acquired question sentence, the response sentence being stored in a storage device in advance;
converting the selected response sentence according to the question sentence; and
outputting the converted response sentence; and
canceling converting of a first word to a second word by using nodes in a neural network when a failure probability exceeds an establishment probability, wherein
in the converting of the selected response sentence, the first word included in the selected response sentence is converted to the second word included in the question sentence when a degree of similarity between the first word included and the second word equal to or greater than a threshold value, the failure probability is a probability that the converted response sentence is not established, and the establishment probability is a probability that the converted response sentence is established.

\* \* \* \* \*